Patented Dec. 20, 1938

2,140,868

UNITED STATES PATENT OFFICE 2,140,868

BENZOYL BENZOIC ESTER PLASTICIZED COMPOSITION

Herbert A. Winkelmann, Chicago, Ill., assignor to Marbon Corporation, Chicago, Ill., a corporation of Delaware No Drawing. Application December 30, 1936, Serial No. 118,324

3 Claims. (Cl. 106—23)

This invention relates to plastic and coating compositions and, more particularly, relates to such compositions comprising a halogen containing rubber derivative and a plasticizer therefor.

The halogen containing rubber derivatives such as chlorinated rubber, rubber hydrochloride, chlorinated rubber hydrochlorides, and vulcanized rubber hydrochlorides are suitable for use in coating and plastic compositions and for some purposes do not require modifying agents. For many purposes, however, it is highly advantageous to use these substances in connection with a plasticizer, i. e., a substance of negligibly low volatility and which dissolves or is dissolved by the halogen containing rubber derivative to render the composition less brittle and more supple than it would otherwise be.

All the halogen containing rubber derivatives are not effected the same by plasticizers. In general the chlorinated rubbers are readily plasticized by a large number of materials, the amorphous rubber hydrochlorides are also readily plasticized, the crystalline saturated rubber hydrochlorides, particularly the highly insoluble type, are more difficult to plasticize and the vulcanized rubber hydrochlorides, in general, the most difficult of all.

I have discovered that the esters of benzoyl benzoic acid are in general good plasticizers for all the halogen containing rubber derivatives including the vulcanized rubber hydrochlorides. It has been found that the benzoates of the class given above are compatible with the halogen containing rubber derivatives, at least to a degree sufficient for the amount of plasticizer that it would ordinarily be desirable to employ, and are practically non-volatile at ordinary atmospheric pressures and temperatures.

In carrying out the invention the plasticizer may be incorporated with the halogen containing rubber derivative by milling, rolling or working the materials together in the absence of volatile solvents and in the presence of magnesium oxide or other basic stabilizers such as described in Winkelmann Patent No. 2,046,986. Alternatively the materials may be incorporated with the aid of a quantity of mutual volatile solvent. Moreover the materials may be incorporated in the rubber prior to reaction with the halogen or hydrohalogen.

The benzoates which are suitable plasticizers include butyl benzoyl benzoate, methyl benzoyl benzoate, ethyl benzoyl benzoate. A particularly suitable compound for plasticizing vulcanized rubber hydrochloride is butyl benzoyl benzoate. All the compounds within this class of esters of benzoyl benzoic acid are practically non-volatile at ordinary atmospheric temperature and pressure, are sufficiently compatible with the halogen containing rubber derivatives to serve as plasticizers, and are readily incorporated in plastics.

The proportion of these plasticizers to be incorporated with the halogen containing rubber derivative will depend, of course, to a large extent on the properties desired in the resulting composition and on the nature of the halogen containing rubber derivative. Preferably the plasticizer will be present in from about 10 to 50% by weight of the amount of halogen containing rubber derivative present. Where great pliability is desired the proportion may be from 50 to 100%.

The esters of benzoyl benzoic acid are particularly valuable plasticizers for vulcanized rubber hydrochlorides. The hot vulcanization of rubber hydrochlorides with minor proportions of sulfur and accelerator produces a relatively soft, elastic, flexible composition which, however, has a slight tendency to "set up" or harden with age. The esters of benzoyl benzoic acid have the important property of not deleteriously effecting the vulcanization of rubber hydrohalides when present in the rubber hydrohalide—sulfur composition, and of plasticizing the vulcanized rubber hydrochlorides so that they will remain soft and supple. These properties are present in only a few out of a large number of nonvolatile organic materials tested.

In order to illustrate the invention, the following examples are given, parts being by weight:

Example I

*Coating composition*

| Ingredients | Parts by weight | | | | |
|---|---|---|---|---|---|
| Amorphous rubber hydrochloride (viz. 29% chlorine) | 10 | 10 | 10 | 10 | 10 |
| Butyl benzoyl benzoate | 1 | 2 | 4 | 6 | 10 |
| Toluol | 100 | 100 | 100 | 100 | 100 |

Example II

*Coating composition*

| Ingredients | Parts by weight | | | | | |
|---|---|---|---|---|---|---|
| Chlorinated rubber (viz. 66% chlorine) | 20 | 20 | 20 | 20 | 20 | 20 |
| Butyl benzol benzoate | 5 | 8 | 10 | 13 | 15 | 20 |
| Xylol | 100 | 100 | 100 | 100 | 100 | 100 |

EXAMPLE III

*Molded compositions (vulcanized rubber hydrochlorides)*

| Ingredients | Parts by weight | |
| --- | --- | --- |
| | A | B |
| Crystalline rubber hydrochloride (32% chlorine) | 100 | 100 |
| Magnesium oxide (MgO) | 10.0 | 10.0 |
| Litharge (PbO) | 10.0 | 10.0 |
| Thermax | 35.0 | 35.0 |
| Butyl aldehyde—aniline | 1.2 | 1.2 |
| Sulful | 2.5 | 2.5 |
| Butyl benzol benzoate | 18.0 | 8.0 |

The above ingredients were milled and fluxed into an intimate mixture and then molded and cured at 287° F. for twenty to sixty minutes. Tensile, modulus at 300%, P. & J. and shore hardness, and elongation tests on the molded products are shown in Tables I and II:

TABLE I

*"A" composition*

| Cure | Mod. 300% | Tensile | Elongation | Set | P. & J. | Shore |
| --- | --- | --- | --- | --- | --- | --- |
| 20' x 287° F | | 1670 | 197 | 12 | 12 | 97 |
| 30' x 287 | 1200 | 1360 | 377 | 23 | 16 | 95 |
| 40' x 287 | 600 | 1610 | 700 | 52 | 56 | 76 |
| 50' x 287 | 600 | 1310 | 660 | 46 | 56 | 75 |
| 60' x 287 | 650 | 1250 | 610 | 44 | 58 | 75 |

TABLE II

*"B" composition*

| Cure | Mod. 300% | Tensile | Elongation | Set | P. & J. | Shore |
| --- | --- | --- | --- | --- | --- | --- |
| 20' x 287° F | | 2220 | 87 | 4 | 10 | 99 |
| 30' x 287 | | 1600 | 220 | 13 | 12 | 98 |
| 40' x 287 | 1300 | 1860 | 470 | 28 | 21 | 93 |
| 50' x 287 | 1150 | 1750 | 567 | 37 | 41 | 83 |
| 60' x 287 | 1140 | 1350 | 427 | 24 | 41 | 81 |

The preparation of other vulcanized rubber hydrochloride compositions is described in detail in my copending application Ser. No. 22,431 filed May 20, 1935.

A large number of esters of benzoyl benzoic acid have been tested as plasticizers for halogen containing rubber derivatives. The high boiling liquid esters and soft solids of the formula

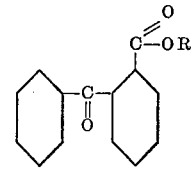

in which R is an alkyl such as methyl, ethyl, propyl, butyl, amyl, hexyl, etc. and the benzoyl group is in the ortho position, are the preferred plasticizers. However, the high boiling liquid and soft solid esters in which R may be an alkyl, aryl, or araryl and the benzoyl group is in the ortho, meta, or para position are also operable.

I claim:

1. A composition comprising a vulcanized rubber hydrochloride and an ester of benzoyl benzoic acid.

2. A composition comprising a vulcanized rubber hydrochloride and an ester of benzoyl benzoic acid, the benzoyl ester being present in amount of from about 10% to 100% by weight of the vulcanized rubber hydrochloride.

3. A composition comprising a vulcanized rubber hydrohalide and as a plasticizer therefor, butyl benzoyl benzoate.

HERBERT A. WINKELMANN.